United States Patent
Zhang et al.

(10) Patent No.: US 10,601,568 B2
(45) Date of Patent: Mar. 24, 2020

(54) INTERFERENCE INDICATION METHOD AND APPARATUS

(71) Applicant: Huawei Technologies Co., Ltd., Shenzhen (CN)

(72) Inventors: Lili Zhang, Beijing (CN); Richard Stirling-Gallacher, Munich (DE); Bin Liu, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 15/764,711

(22) PCT Filed: Oct. 8, 2015

(86) PCT No.: PCT/CN2015/091495
§ 371 (c)(1),
(2) Date: Mar. 29, 2018

(87) PCT Pub. No.: WO2017/059572
PCT Pub. Date: Apr. 13, 2017

(65) Prior Publication Data
US 2018/0270039 A1    Sep. 20, 2018

(51) Int. Cl.
*H04L 5/00* (2006.01)
*H04W 16/10* (2009.01)
(Continued)

(52) U.S. Cl.
CPC .......... *H04L 5/0073* (2013.01); *H04L 5/16* (2013.01); *H04W 16/10* (2013.01);
(Continued)

(58) Field of Classification Search
CPC ...... H04L 5/0073; H04L 5/16; H04W 72/082; H04W 16/10; H04W 24/10; H04W 72/0446; H04W 24/02
See application file for complete search history.

(56) References Cited

U.S. PATENT DOCUMENTS

2012/0202540 A1* 8/2012 Lee ................ H04W 72/082
455/501
2014/0315566 A1* 10/2014 Lee ................ H04W 72/082
455/452.2
(Continued)

FOREIGN PATENT DOCUMENTS

CN     103650557 A     3/2014
CN     104412685 A     3/2015
(Continued)

OTHER PUBLICATIONS

Foreign Communication From a Counterpart Application, European Application No. 15905670.4, Extended European Search Report dated Jul. 26, 2018, 9 pages.
(Continued)

*Primary Examiner* — Dady Chery
(74) *Attorney, Agent, or Firm* — Conley Rose, P.C.

(57) ABSTRACT

An interference indication method and apparatus are presented. After detecting interference from a neighboring cell, a base station sends interference indication information to the neighboring cell, where the interference indication information includes at least indication information of a frequency resource that receives the interference from the neighboring cell and that is configured to be in a flexible half-duplex mode, so as to indicate that the interference from the neighboring cell is interference on the frequency resource configured to be in the flexible half-duplex mode. In this way, in an application scenario of a flexible half-duplex technology, a base station can learn of a status of interference from a neighboring cell, so as to use a corresponding interference suppression mechanism.

16 Claims, 1 Drawing Sheet

(51) Int. Cl.
  *H04W 72/08* (2009.01)
  *H04L 5/16* (2006.01)
  *H04W 24/02* (2009.01)
  *H04W 24/10* (2009.01)
  *H04W 72/04* (2009.01)

(52) U.S. Cl.
  CPC .......... *H04W 72/082* (2013.01); *H04W 24/02* (2013.01); *H04W 24/10* (2013.01); *H04W 72/0446* (2013.01)

(56) References Cited

U.S. PATENT DOCUMENTS

| | | |
|---|---|---|
| 2015/0103706 A1 | 4/2015 | Li et al. |
| 2015/0189666 A1 | 7/2015 | Wang et al. |
| 2016/0128073 A1* | 5/2016 | Nagata .................. H04L 5/1469 370/280 |

FOREIGN PATENT DOCUMENTS

| | | |
|---|---|---|
| CN | 104717732 A | 6/2015 |
| EP | 2712231 A1 | 3/2014 |
| WO | 2013056494 A1 | 4/2013 |
| WO | 2014000236 A1 | 1/2014 |
| WO | 2014110783 A1 | 7/2014 |
| WO | 2014196276 A1 | 12/2014 |

OTHER PUBLICATIONS

"3rd Generation Partnership Project; Technical Specification Group Radio Access Network; Evolved Universal Terrestrial Radio Access (E-UTRA); Physical layer procedures (Release 11)," 3GPP TS 36.213, V11.11.0, Jun. 2015, 183 pages.

"3rd Generation Partnership Project; Technical Specification Group Radio Access Network; Evolved Universal Terrestrial Radio Access Network (E-UTRAN); X2 application protocol (X2AP) (Release 13)," 3GPP TS 36.423, V13.1.0, Sep. 2015, 216 pages.

Foreign Communication From a Counterpart Application, PCT Application No. PCT/CN2015/091495, English Translation of International Search Report dated Jun. 30, 2016, 2 pages.

Foreign Communication From a Counterpart Application, PCT Application No. PCT/CN2015/091495, English Translation of Written Opinion dated Jun. 30, 2016, 5 pages.

Machine Translation and Abstract of Chinese Publication No. CN104717732, Jun. 17, 2015, 23 pages.

Foreign Communication From a Counterpart Application, Chinese Application No. 201580083691.9, Chinese Office Action dated Nov. 18, 2019, 7 pages.

* cited by examiner

INTERFERENCE INDICATION METHOD AND APPARATUS

CROSS-REFERENCE TO RELATED APPLICATIONS

This application is a national stage of International Application No. PCT/CN2015/091495, filed on Oct. 8, 2015, which is hereby incorporated by reference in its entirety.

TECHNICAL FIELD

The present disclosure relates to the field of wireless communications, and in particular, to an interference indication method and apparatus.

BACKGROUND

In a time division duplex (TDD) system, a same spectrum is allocated to an uplink and a downlink, and the uplink and the downlink occupy different time periods. Currently, in an Long Term Evolution (LTE) system, neighboring cells use a same TDD configuration mode (that is, an uplink-downlink timeslot configuration) as much as possible, to avoid inter-cell interference from an uplink (UL) to a downlink (DL) and inter-cell interference from a DL to a UL.

To improve frequency utilization, a TDD system may allocate different uplinks and downlinks in different timeslots, so as to make full use of wireless resources and adapt to asymmetry of different services. Such a technology of adaptively implementing an uplink-downlink timeslot configuration according to a service need of a network device is usually referred to as a flexible half-duplex technology.

However, when neighboring cells use different timeslot configurations, cross-timeslot interference is generated, that is, when a cell uses one timeslot to transmit uplink information and a neighboring cell uses the same timeslot to transmit downlink information, there is interference between the two cells, which is presented as interference from one base station to another or interference from one piece of user equipment to another. Such interference reduces a system capacity, or even leads to a call drop and blocking.

To make full use of advantages of the TDD system, dynamically adjust uplink-downlink resource allocation, and improve spectrum efficiency, a proper technical solution needs to be used to overcome impact of cross-timeslot interference. To reduce or avoid the cross-timeslot interference, a base station performing interference suppression needs to learn of an interference status of a neighboring cell. Therefore, in an application scenario of the flexible half-duplex technology, how to indicate interference is a problem that urgently needs to be resolved currently.

SUMMARY

Embodiments of the present disclosure provide an interference indication method and apparatus.

According to a first aspect, an interference indication method is provided, including detecting, by a base station, interference from a neighboring cell; and sending, by the base station, interference indication information to the neighboring cell, where the interference indication information includes at least indication information of a frequency resource that receives the interference from the neighboring cell, and the frequency resource is a frequency resource configured to be in a flexible half-duplex mode.

With reference to the first aspect, in a first possible implementation of the first aspect, the interference indication information further includes one piece of or a combination of the following information: indication information of a subframe that receives the interference from the neighboring cell and that is on the frequency resource; indication information of a physical resource block (PRB) that receives the interference from the neighboring cell and that is on the frequency resource; or interference level indication information of the interference from the neighboring cell.

With reference to the first possible implementation of the first aspect, in a second possible implementation of the first aspect, the subframe that receives the interference from the neighboring cell and that is on the frequency resource is a subframe that receives reverse transmission interference from the neighboring cell and that is on the frequency resource; or the PRB that receives the interference from the neighboring cell and that is on the frequency resource is a PRB that receives reverse transmission interference from the neighboring cell and that is on the frequency resource.

With reference to any one of the first aspect or the first to the second possible implementations of the first aspect, in a third possible implementation of the first aspect, the interference indication information is carried in first signaling for transmission.

With reference to any one of the first aspect or the first to the second possible implementations of the first aspect, in a fourth possible implementation of the first aspect, the interference indication information is carried in first signaling and second signaling for transmission, where the first signaling includes the interference level indication information of the interference from the neighboring cell, and the second signaling includes the indication information of the frequency resource that receives the interference from the neighboring cell.

With reference to the fourth possible implementation of the first aspect, in a fifth possible implementation of the first aspect, the first signaling further includes the indication information of the subframe and/or the PRB that receive/receives the interference from the neighboring cell; or the second signaling further includes the indication information of the subframe and/or the PRB that receive/receives the interference from the neighboring cell.

With reference to the first aspect, in a sixth possible implementation of the first aspect, the interference indication information is carried in second signaling and overload indication (OI) signaling for transmission, where the second signaling includes the indication information of the frequency resource that receives the interference from the neighboring cell, and the OI signaling includes interference level indication information of the interference from the neighboring cell to the frequency resource indicated by the first interference indication signaling.

With reference to the sixth possible implementation of the first aspect, in a seventh possible implementation of the first aspect, the OI signaling further includes indication information of a subframe and/or a PRB that receive/receives the interference from the neighboring cell; or the second signaling further includes indication information of a subframe and/or a PRB that receive/receives the interference from the neighboring cell.

With reference to the first aspect, in an eighth possible implementation of the first aspect, the interference indication information is carried in second signaling and high interference indication (HII) signaling for transmission, where the second signaling includes the indication information of the frequency resource that receives the interference from the neighboring cell, and the HII signaling includes indication information of a PRB that probably causes interference to the neighboring cell and that is on the frequency resource indicated by the second signaling.

With reference to the eighth possible implementation of the first aspect, in a ninth possible implementation of the first aspect, the HII signaling further includes indication information of a subframe that receives the interference from the neighboring cell, and/or interference level indication information; or the second signaling further includes indication information of a subframe and/or a PRB that receive/receives the interference from the neighboring cell.

With reference to any one of the first aspect or the first to the ninth possible implementations of the first aspect, in a tenth possible implementation of the first aspect, the method further includes receiving, by the base station, indication information of a time resource and/or a frequency resource that are/is configured to be in the flexible half-duplex mode, where the indication information is sent by the neighboring cell; and/or sending, by the base station, indication information of a time resource and/or a frequency resource that are/is configured to be in the flexible half-duplex mode.

With reference to the tenth possible implementation of the first aspect, in an eleventh possible implementation of the first aspect, the indication information of the time resource and/or the frequency resource that are/is configured to be in the flexible half-duplex mode is sent by means of semi-persistent broadcasting.

According to a second aspect, a base station is provided, including an interference detection module configured to detect interference from a neighboring cell; and an interference indication module configured to send interference indication information to the neighboring cell, where the interference indication information includes at least indication information of a frequency resource that receives the interference from the neighboring cell, and the frequency resource is a frequency resource configured to be in a flexible half-duplex mode.

With reference to the second aspect, in a first possible implementation of the second aspect, the interference indication information further includes one piece of or a combination of the following information: indication information of a subframe that receives the interference from the neighboring cell and that is on the frequency resource; indication information of a PRB that receives the interference from the neighboring cell and that is on the frequency resource; or interference level indication information of the interference from the neighboring cell.

With reference to the first possible implementation of the second aspect, in a second possible implementation of the second aspect, the subframe that receives the interference from the neighboring cell and that is on the frequency resource is a subframe that receives reverse transmission interference from the neighboring cell and that is on the frequency resource; or the PRB that receives the interference from the neighboring cell and that is on the frequency resource is a PRB that receives reverse transmission interference from the neighboring cell and that is on the frequency resource.

With reference to any one of the second aspect or the first to the second possible implementations of the second aspect, in a third possible implementation of the second aspect, the interference indication information is carried in first signaling for transmission.

With reference to any one of the second aspect or the first to the second possible implementations of the second aspect, in a fourth possible implementation of the second aspect, the interference indication information is carried in first signaling and second signaling for transmission, where the first signaling includes the interference level indication information of the interference from the neighboring cell, and the second signaling includes the indication information of the frequency resource that receives the interference from the neighboring cell.

With reference to the fourth possible implementation of the second aspect, in a fifth possible implementation of the second aspect, the first signaling further includes the indication information of the subframe and/or the PRB that receive/receives the interference from the neighboring cell; or the second signaling further includes the indication information of the subframe and/or the PRB that receive/receives the interference from the neighboring cell.

With reference to the second aspect, in a sixth possible implementation of the second aspect, the interference indication information is carried in second signaling and OI signaling for transmission, where the second signaling includes the indication information of the frequency resource that receives the interference from the neighboring cell, and the OI signaling includes interference level indication information of the interference from the neighboring cell to the frequency resource indicated by the first interference indication signaling.

With reference to the sixth possible implementation of the second aspect, in a seventh possible implementation of the second aspect, the OI signaling further includes indication information of a subframe and/or a PRB that receive/receives the interference from the neighboring cell; or the second signaling further includes indication information of a subframe and/or a PRB that receive/receives the interference from the neighboring cell.

With reference to the second aspect, in an eighth possible implementation of the second aspect, the interference indication information is carried in second signaling and HII signaling for transmission, where the second signaling includes the indication information of the frequency resource that receives the interference from the neighboring cell, and the HII signaling includes indication information of a PRB that probably causes interference to the neighboring cell and that is on the frequency resource indicated by the second signaling.

With reference to the eighth possible implementation of the second aspect, in a ninth possible implementation of the second aspect, the HII signaling further includes indication information of a subframe that receives the interference from the neighboring cell, and/or interference level indication information; or the second signaling further includes indication information of a subframe and/or a PRB that receive/receives the interference from the neighboring cell.

With reference to any one of the second aspect or the first to the ninth possible implementations of the second aspect, in a tenth possible implementation of the second aspect, the following is further included receiving, by the base station, indication information of a time resource and/or a frequency resource that are/is configured to be in the flexible half-duplex mode, where the indication information is sent by the neighboring cell; and/or sending, by the base station, indication information of a time resource and/or a frequency resource that are/is configured to be in the flexible half-duplex mode.

With reference to the tenth possible implementation of the second aspect, in an eleventh possible implementation of the second aspect, the indication information of the time resource and/or the frequency resource that are/is configured to be in the flexible half-duplex mode is sent by means of semi-persistent broadcasting.

According to a third aspect, a base station is provided. The base station includes a processing unit and a memory. The processing unit is configured to control an operation of the base station; and the memory is configured to provide an instruction and data for the processing unit.

An interference indication procedure implemented by the base station disclosed in an embodiment of the present disclosure may be applied to the processing unit or be implemented by the processing unit. During implementation, steps in the interference indication procedure implemented by the base station may be implemented using an integrated logic circuit of hardware in the processing unit, or using an instruction in a form of software. The steps of the methods disclosed with reference to this embodiment of the present disclosure may be directly implemented by a hardware processor, or may be implemented by a combination of hardware and a software module in a processor. The software module may be in a random access memory, a flash memory, a read-only memory, a programmable read-only memory or an electrically erasable programmable memory, a register, or another mature storage medium in the art. The storage medium is located in the memory. The processing unit reads information in the memory and completes, with reference to hardware of the processing unit, the steps of the interference indication procedure implemented by the base station.

Specifically, the processing unit may be configured to execute the foregoing interference indication procedure described in this embodiment. The procedure may include detecting interference from a neighboring cell; and sending interference indication information to the neighboring cell, where the interference indication information includes at least indication information of a frequency resource that receives the interference from the neighboring cell, and the frequency resource is a frequency resource configured to be in a flexible half-duplex mode.

For a specific implementation process, reference may be made to any one of the first aspect or the possible implementations of the first aspect, and details are not described herein again.

In the foregoing embodiments of the present disclosure, after detecting the interference from the neighboring cell, the base station sends the interference indication information to the neighboring cell, where the interference indication information includes at least the indication information of the frequency resource that receives the interference from the neighboring cell and that is configured to be in the flexible half-duplex mode, so as to indicate that the interference from the neighboring cell is interference on the frequency resource configured to be in the flexible half-duplex mode. In this way, in an application scenario of a flexible half-duplex technology, a base station can learn of a status of interference from a neighboring cell, so as to use a corresponding interference suppression mechanism.

BRIEF DESCRIPTION OF DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings. Apparently, the described embodiments are merely some rather than all of the embodiments of the present disclosure. All other embodiments obtained by persons of ordinary skill in the art based on the embodiments of the present disclosure without creative efforts shall fall within the protection scope of the present disclosure.

In the embodiments of the present disclosure, a base station may be an evolved NodeB (eNB or e-NodeB), a macro base station, a micro base station (also referred to as a "small cell"), a picocell base station, an access point (AP), a transmission point (TP), or the like in an LTE system or a Licensed-Assisted Access LTE (LAA-LTE) system. This is not limited by the present disclosure.

In the embodiments of the present disclosure, user equipment (UE) may be referred to as a terminal, a mobile station (MS), a mobile terminal, or the like. The user equipment may communicate with one or more core networks through a radio access network (RAN). For example, the user equipment may be a mobile phone (also referred to as a "cellular" phone) or a computer with a mobile terminal. For example, the user equipment may be a portable mobile apparatus, a pocket-sized mobile apparatus, a handheld mobile apparatus, a computer built-in mobile apparatus, or an in-vehicle mobile apparatus, and they exchange voice and/or data with the radio access network.

For ease of description, the base station and the user equipment are used as examples for description in the following embodiments.

It should be understood that, in the embodiments of the present disclosure, some time resources and/or frequency resources may be configured as flexible half-duplex time resources and/or frequency resources. For example, some frequency bands (band) or frequency subbands (subband), some subframes, or some PRBs may be configured as flexible half-duplex resources. For example, operators can use three frequency bands with frequency ranges from 1880 to 1900 megahertz (MHz), from 2320 to 2370 MHz, and from 2575 to 2635 MHz. If channel bandwidth is 20 MHz, 1880 to 1900 MHz, 2320 to 2340 MHz, and 2350 to 2370 MHz are frequency subbands.

Figure 1:
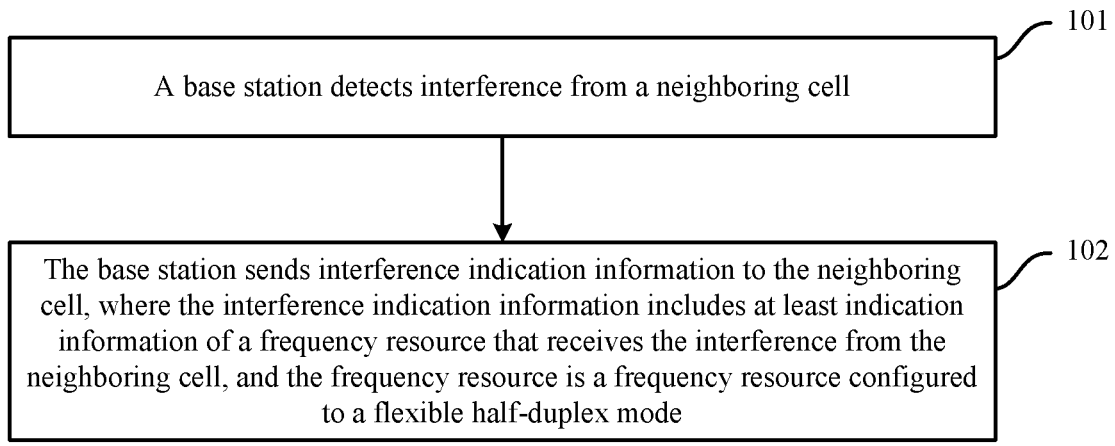
FIG. 1 is a schematic diagram of an interference indication procedure according to an embodiment of the present disclosure.

Referring to FIG. 1, FIG. 1 is a schematic diagram of an interference indication procedure according to an embodiment of the present disclosure. The procedure may be executed by a base station.

As shown in the figure, the procedure may include the following steps.

Step 101: The base station detects interference from a neighboring cell.

In this step, the base station may detect the interference from the neighboring cell according to a signal sent by or a measurement report reported by a terminal in a coverage area of the base station. For example, from a perspective of an uplink, the base station may detect, according to an uplink signal sent by the terminal, interference received by each PRB; from a perspective of a downlink, the base station may detect interference according to reference signal received quality (RSRQ) or a signal to interference plus noise ratio (SINR) reported by the terminal.

Step 102: The base station sends interference indication information to the neighboring cell, where the interference indication information includes at least indication information of a frequency resource that receives the interference from the neighboring cell, the frequency resource is a frequency resource configured to be in a flexible half-duplex mode, and the frequency resource includes one or a combination of a frequency band, a frequency subband, a partial frequency band, or a partial frequency subband.

In step 102, the base station may send, using an inter-base station link (such as an X2 interface), the foregoing interference indication information to a base station serving the neighboring cell.

By performing step 102, the base station may indicate, using the interference indication information, which frequency band, frequency subband, partial frequency band, or partial frequency subband, on the frequency resource that is of the base station and that is configured to be in the flexible half-duplex mode, receives the interference from the neighboring cell. The indication information of the frequency resource included in the interference indication information may be frequency-range information of the frequency band, the frequency subband, the partial frequency band, or the partial frequency subband. Preferably, to reduce signaling overheads, the indication information of the frequency resource may alternatively be represented by an identity of the frequency band, the frequency subband, the partial frequency band, or the partial frequency subband. Each frequency band, frequency subband, partial frequency band, or partial frequency subband is identified using a unique identifier (ID).

Preferably, the interference indication information not only includes the indication information of the frequency resource configured to be in the flexible half-duplex mode, but also may include one piece of or a combination of the following information: indication information of a subframe that receives the interference from the neighboring cell and that is on the frequency resource configured to be in the flexible half-duplex mode, where the indication information of the subframe may be specifically a subframe index; indication information of a PRB that receives the interference from the neighboring cell and that is on the frequency resource configured to be in the flexible half-duplex mode, where the indication information of the PRB may be specifically a PRB index, such as a PRB number; or interference level indication information of the interference from the neighboring cell, where an interference level may be specifically defined according to an existing protocol, or may be redefined.

Further, if the base station is capable of learning of an uplink-downlink timeslot configuration of the neighboring cell, the base station may detect in step 101 whether the interference from the neighboring cell is reverse transmission interference. If the interference is the reverse transmission interference, there are two cases: In step 102, if the interference indication information includes the indication information of the subframe that receives the interference from the neighboring cell and that is on the frequency resource, the subframe is a subframe that receives the reverse transmission interference from the neighboring cell and that is on the frequency resource configured to be in the flexible half-duplex mode; or if the interference indication information includes the indication information of the PRB that receives the interference from the neighboring cell and that is on the frequency resource, the PRB is a PRB that receives the reverse transmission interference from the neighboring cell and that is on the frequency resource configured to be in the flexible half-duplex mode.

For example, a cell A detects interference from a cell B. Reverse transmission interference from the cell B to the cell A is interference from a downlink of the cell B to the cell A in an uplink transmission time period of the cell A or interference from an uplink of the cell B to the cell A in a downlink transmission time period of the cell A. The cell A is capable of learning of an uplink-downlink timeslot configuration of the cell B. Therefore, when the cell A receives the interference from the cell B in the uplink transmission time period of the cell A, if the cell A determines, according to the uplink-downlink timeslot configuration of the cell B, that the cell B performs downlink transmission in this time period, the interference from the cell B in this time period is considered to be reverse transmission interference. Similarly, when the cell A receives the interference from the cell B in the downlink transmission time period of the cell A, if the cell A determines, according to the uplink-downlink timeslot configuration of the cell B, that the cell B performs uplink transmission in this time period, the interference from the cell B in this time period is considered to be reverse transmission interference.

Preferably, for the foregoing cases, in some embodiments, the interference indication information may carry additional indication information, to indicate whether the detected interference from the neighboring cell is reverse transmission interference. For example, the interference indication information may carry an indication identifier, to indicate whether the interference is reverse transmission interference from the neighboring cell. Alternatively, an indication identifier may be set for each frequency band, frequency subband, partial frequency band, partial frequency subband, subframe, or PRB, to indicate whether interference received by a corresponding frequency band, frequency subchannel, partial frequency band, partial frequency subband, subframe, or PRB is reverse transmission interference from the neighboring cell. Certainly, for the foregoing cases, the interference that is from the neighboring cell and that is indicated by the interference indication information may be considered to be reverse transmission interference by default.

In the foregoing procedure, the interference indication information may be carried in signaling for transmission. Several preferred solutions of sending the foregoing interference indication information by means of signaling are provided in this embodiment of the present disclosure. Respective descriptions are given below.

Solution (1): Asymmetric link direction indicator (ALI) signaling is used alone.

In solution (1), a new type of signaling is used to carry the foregoing interference indication information and is particularly applied to a scenario in which the interference indicated by the interference indication information is reverse transmission interference from the neighboring cell. Herein, the newly-used signaling is referred to as first signaling or ALI signaling. In the following descriptions, the signaling is referred to as the ALI signaling.

The ALI signaling includes the indication information of the frequency resource that receives the interference from the neighboring cell and that is configured to be in the flexible half-duplex mode, and the indication information of the subframe and/or the PRB that receive/receives the interference from the neighboring cell and that are/is on the frequency resource. Further, the ALI signaling may further include the interference level indication information. In this way, when only the ALI signaling is configured, the ALI signaling may be used to indicate which frequency band, frequency subband, partial frequency band, or partial frequency subband on the frequency resource configured to be in the flexible half-duplex mode receives the reverse transmission interference from the neighboring cell, and which subframe and/or PRB on the frequency resource receive/receives the reverse transmission interference from the neighboring cell, and may further indicate severity of the received interference.

During specific implementation, for each frequency resource configured to be in the flexible half-duplex mode, such as a frequency band, a frequency subband, a partial frequency band, or a partial frequency subband, a subframe and/or a PRB that receive/receives the reverse transmission interference from the neighboring cell and that are/is on the frequency resource and an interference status of the subframe and/or the PRB may be separately indicated. In this case, ALI indication information corresponding to different frequency resources configured to be in the flexible half-duplex mode may be different. For example, ALI indication information corresponding to a frequency band or frequency subband includes a reverse transmission indication identifier, or a value of the identifier is used to represent reverse transmission interference, while ALI indication information corresponding to another frequency band or frequency subband does not include the reverse transmission indication identifier, or a value of the identifier is used to represent codirectional transmission interference.

For an ALI signaling format, reference may be made to an OI signaling format. Table 1 shows an example of an ALI signaling format.

In solution (2), a new type of signaling is used together with the ALI signaling, to carry the interference indication information. Herein, the newly-used signaling is referred to as second signaling or the R_ind signaling. In the following descriptions, the signaling is referred to as the R_ind signaling.

The R_ind signaling includes the indication information of the frequency resource that receives the interference from the neighboring cell and that is configured to be in the flexible half-duplex mode. A frequency resource indicated by an R_ind may be any frequency division duplex (FDD) UL frequency band. The ALI signaling may include the interference level indication information of the interference from the neighboring cell.

Further, in some embodiments, the R_ind signaling may further include the indication information of the subframe and/or the PRB that receive/receives the interference from the neighboring cell and that are/is on the frequency resource. In some other embodiments, the ALI signaling may further include indication information of a subframe and/or a PRB that receive/receives the interference from the neighboring cell and that are/is on the frequency resource indicated by the R_ind signaling.

Preferably, the R_ind signaling and the ALI signaling may be periodically sent, and a sending period of the R_ind signaling may be different from a sending period of the ALI signaling.

Solution (3): R_ind signaling is used together with OI signaling.

In an LTE system, an OI is obtained based on a measurement. A source cell (or a source base station) that sends the OI indicates an interference status of each PRB of the cell using the OI, and the interference is classified into three levels: high, moderate, and low. In a neighboring cell that receives the OI, interference power adjustment and user scheduling adjustment may be performed on a corresponding PRB according to the received OI, so that the interference from the source cell to the neighboring cell is alleviated.

In the solution in which the R_ind signaling is used together with the OI signaling, the R_ind signaling includes

TABLE 1

ALI signaling format

| IE/group name (Information element/ group name) | Presence (Mandatory or optional) | Range (Value range) | IE type and reference (Information element type and description) | Semantics description (Description) |
| --- | --- | --- | --- | --- |
| Cross Link Interference Overload Indication List (cross link interference overload indication list) | | 1 . . . <maxnoofPRBs> | | |
| >subband index (frequency subband index) | O (Optional) | | | |
| >subframe index (subframe index) | O (Optional) | | | |
| >UL Interference Overload Indication (uplink interference overload indication) | M (Mandatory) | | Enumeration (high interference, moderate interference, low interference, . . .) | A location of each PRB in the list is used to identify the PRB. For example, the first IE in the list is corresponding to a PRB 0, the second IE is corresponding to a PRB 1, and so on. |

In Table 1, a value of maxnoofPRBs is a maximum value of a PRB number, such as 110.

Solution (2): resource indicator (R_ind) signaling is used together with ALI signaling.

the indication information of the frequency resource that receives the interference from the neighboring cell and that is configured to be in the flexible half-duplex mode, and the OI signaling includes the interference level indication information of the interference from the neighboring cell.

Further, in some embodiments, the R_ind signaling may further include the indication information of the subframe and/or the PRB that receive/receives the interference from the neighboring cell and that are/is on the frequency resource. In some other embodiments, the OI signaling may further include indication information of a subframe and/or a PRB that receive/receives the interference from the neighboring cell and that are/is on the frequency resource indicated by the R_ind signaling.

The OI may be interpreted correspondingly based on the R_ind. For example, in some embodiments, if an R_ind sent by a small cell indicates a frequency band or a frequency subband and a specific subframe set of the small cell, an OI sent by the small cell means that on a resource indicated by the R_ind, some PRBs of the small cell receive interference.

Preferably, the R_ind signaling and the OI signaling may be periodically sent, and a sending period of the R_ind signaling may be different from a sending period of the OI signaling.

Solution (4): R_ind signaling is used together with HII signaling.

An HII indicates PRBs that will be allocated by the cell to an edge user in a period of time in future, so that a neighboring cell avoids using these PRBs as much as possible while performing scheduling for the edge user. The HII is scheduling information based on the edge user of the cell. In a source cell (or a source base station) that sends the HII, the HII is used to indicate a status of resource blocks that will be allocated by the cell to an edge terminal of the cell. These resource blocks cause relatively high interference to a neighboring base station, and are rather sensitive to interference from the neighboring base station. In a destination cell that receives the HII, resource blocks that are of a neighboring cell and that will cause strong interference are determined by monitoring the HII of the neighboring cell. Scheduling avoidance or power adjustment is implemented for these resource blocks.

In the solution in which the R_ind signaling is used together with the HII signaling, the R_ind signaling includes the indication information of the frequency resource that receives the interference from the neighboring cell and that is configured to be in the flexible half-duplex mode, and the HII signaling includes indication information of a PRB that probably causes interference to the neighboring cell and that is on the frequency resource indicated by the R_ind signaling.

Further, in some embodiments, the R_ind signaling may further include the indication information of the subframe and/or the PRB that receive/receives the interference from the neighboring cell and that are/is on the frequency resource. In some other embodiments, the HII signaling may further include indication information of a subframe that receives the interference from the neighboring cell and that is on the frequency resource indicated by the R_ind signaling, and/or interference level indication information.

The HII is interpreted correspondingly based on an R_ind. For example, if an R_ind sent by a macro cell indicates a frequency band or a frequency subband and a downlink subframe of the macro cell, an HII sent by the macro cell means that downlink transmission of the macro cell may cause high interference to uplink transmission of a small cell.

Further, new signaling may be further used in this embodiment of the present disclosure, and the signaling is used to indicate a time resource and/or a frequency resource that are/is configured to be in the flexible half-duplex mode. In this embodiment of the present disclosure, the signaling is referred to as a flexible duplex resource indication ($FD_{res\_}$ind).

Specifically, the $FD_{res\_}$ind signaling may include one piece of or a combination of the following information: indication information of a frequency resource configured to be in the flexible half-duplex mode, where the frequency resource may specifically include one or a combination of a frequency band, a frequency subband, a partial frequency band, or a partial frequency subband, and the indication information of the frequency resource may be identity information of the frequency band, the frequency subband, the partial frequency band, or the frequency subband; indication information of a subframe configured to be in the flexible half-duplex mode, where the indication information of the subframe may be specifically a subframe index; or indication information of a PRB configured to be in the flexible half-duplex mode, where the indication information of the PRB may be specifically a PRB index, such as a PRB number.

Further, when a source base station that sends the $FD_{res\_}$ind signaling is capable of learning of an uplink-downlink timeslot configuration of a neighboring cell (or a neighboring base station), a transmission direction of the time resource and/or the frequency resource that are/is configured to be in the flexible half-duplex mode and that are/is indicated by the $FD_{res\_}$ind signaling is opposite to a transmission direction of a resource of the neighboring cell in a same time period, that is, transmission, performed by the cell or base station that sends the $FD_{res\_}$ind signaling, on the time resource and/or the frequency resource indicated by the $FD_{res\_}$ind signaling may cause reverse transmission interference to the neighboring cell.

Preferably, the $FD_{res\_}$ind signaling may be sent by means of semi-persistent broadcasting. For example, the $FD_{res\_}$ind signaling may be operation and management (OAM) configuration signaling, or X2 interface signaling, or may be over the air (OTA) interface signaling.

The $FD_{res\_}$ind signaling may be configured to be sent by a macro-cell base station, or may be configured to be sent by a small-cell base station.

The $FD_{res\_}$ind signaling may also be used together with the foregoing signaling used for interference indication. The following describes several solutions in which the $FD_{res\_}$ind signaling is used together with another signaling.

Solution (5): $FD_{res\_}$ind signaling is used together with OI signaling.

For example, the $FD_{res\_}$ind signaling is configured to be sent by a macro-cell base station. A small-cell base station may learn, according to the $FD_{res\_}$ind signaling sent by the macro-cell base station, of a time resource and/or a frequency resource that are/is configured to be in the flexible half-duplex mode. After receiving OI signaling sent by the macro-cell base station, a small cell may perform interference suppression according to an uplink-downlink timeslot configuration of a macro cell. In addition, the small cell may send OI signaling to the macro-cell base station, to indicate that the small cell receives interference from the macro cell.

Solution (6): $FD_{res\_}$ind signaling is used together with HII signaling.

For example, the $FD_{res\_}$ind signaling is configured to be sent by a macro-cell base station. A small-cell base station may learn, according to the $FD_{res\_}$ind signaling sent by the macro-cell base station, of a time resource and/or a frequency resource that are/is configured to be in the flexible half-duplex mode. After receiving HII signaling sent by the macro-cell base station, a small cell may perform interference suppression according to an uplink-downlink timeslot configuration of a macro cell. In addition, the small cell may send HII signaling to the macro-cell base station, to indicate that the small cell may cause interfere to the macro cell.

Solution (7): $FD_{res\_}$ind signaling is used together with ALI signaling.

For example, the $FD_{res\_}$ind signaling is configured to be sent by a macro-cell base station. A small-cell base station may learn, according to the $FD_{res\_}$ind signaling sent by the macro-cell base station, of a time resource and/or a frequency resource that are/is configured to be in the flexible half-duplex mode. A small cell may send ALI signaling to the macro-cell base station, to indicate that the small cell receives interference from a macro cell on the frequency resource indicated by the $FD_{res\_}$ind signaling. Further, interference indicated by the ALI signaling is reverse transmission interference received by the small cell from the macro cell.

Solution (8): $FD_{res\_}$ind signaling is used together with ALI signaling and R_ind signaling.

For example, the $FD_{res\_}$ind signaling is configured to be sent by a macro-cell base station. A small-cell base station may learn, according to the $FD_{res\_}$ind signaling sent by the macro-cell base station, of a time resource and/or a frequency resource that are/is configured to be in the flexible half-duplex mode. A small cell may send ALI signaling and R_ind signaling to the macro-cell base station. The R_ind signaling is used to indicate that the small cell receives interference from a macro cell on the frequency resource indicated by the $FD_{res\_}$ind signaling, and the ALI signaling is used to indicate an interference level of the interference received by small cell.

To sum up, in the foregoing embodiment of the present disclosure, after detecting the interference from the neighboring cell, the base station sends the interference indication information to the neighboring cell, where the interference indication information includes at least the indication information of the frequency resource that receives the interference from the neighboring cell and that is configured to be in the flexible half-duplex mode, so as to indicate that the interference from the neighboring cell is interference on the frequency resource configured to be in the flexible half-duplex mode. In this way, in an application scenario of a flexible half-duplex technology, a base station can learn of a status of interference from a neighboring cell, so as to use a corresponding interference suppression mechanism.

For better understanding of this embodiment of the present disclosure, the following describes an implementation process of the foregoing embodiment in detail using a specific scenario as an example.

Scenario 1

A macro cell is adjacent to a small cell. Both the macro cell and the small cell are operating on a frequency subband subband i, and the subband i is a frequency subband configured to be in the flexible half-duplex mode.

An uplink-downlink timeslot configuration of the macro cell on the subband i is presented in Table 2 in a sequence from a subframe 0 to a subframe 9.

TABLE 2

| Uplink-downlink timeslot configuration of the macro cell on the subband i | | | | | | | | | |
|---|---|---|---|---|---|---|---|---|---|
| Subframe 0 | Subframe 1 | Subframe 2 | Subframe 3 | Subframe 4 | Subframe 5 | Subframe 6 | Subframe 7 | Subframe 8 | Subframe 9 |
| D | S | U | D | D | D | S | U | D | D |

An uplink-downlink timeslot configuration of the small cell on the subband i is presented in Table 3 in a sequence from a subframe 0 to a subframe 9.

TABLE 3

| Uplink-downlink timeslot configuration of the small cell on the subband i | | | | | | | | | |
|---|---|---|---|---|---|---|---|---|---|
| Subframe 0 | Subframe 1 | Subframe 2 | Subframe 3 | Subframe 4 | Subframe 5 | Subframe 6 | Subframe 7 | Subframe 8 | Subframe 9 |
| D | S | U | U | D | D | S | U | U | D |

D represents a downlink subframe, U represents an uplink subframe, and S represents a special subframe.

When the foregoing solution (1) is used, if on the subband i, a small-cell base station detects that there is high interference in the subframe 3 (an uplink subframe), the small-cell base station sends ALI signaling to a macro-cell base station, to indicate PRBs that receive interference and that are on the subframe 3 of the subband i configured to be in the flexible half-duplex mode. Further, if the small cell is capable of learning of the uplink-downlink timeslot configuration of the macro cell, the small-cell base station can determine the interference on the subframe 3 is reverse transmission interference from the macro cell, so that PRBs that receive reverse transmission interference from a neighboring cell and that are on the subframe 3 of the subband i configured to be in the flexible half-duplex mode can be indicated using the ALI signaling.

When the foregoing solution (2) is used, if on the subband i, a small-cell base station detects that there is high interference in the subframe 3 (an uplink subframe), the small-cell base station sends ALI signaling and R_ind signaling to a macro-cell base station. The R_ind signaling is used to indicate that the small cell receives interference from a macro cell on the subband i configured to be in the flexible half-duplex mode, and the ALI signaling is used to indicate PRBs that receive interference and that are on the subframe 3 of the subband i.

When the foregoing solution (3) is used, if on the subband i, a small-cell base station detects that there is high interference in the subframe 3 (an uplink subframe), the small-cell base station sends OI signaling and R_ind signaling to a macro-cell base station. The R_ind signaling is used to indicate that the small cell receives interference from a macro cell on the subframe 3 of the subband i configured to be in the flexible half-duplex mode, and the OI signaling is used to indicate an interference level of the interference received by the small cell.

Scenario 2

A macro cell is adjacent to a small cell. Both the macro cell and the small cell are operating on a frequency subband subband I, and the subband I is a frequency subband configured to be in the flexible half-duplex mode.

An uplink-downlink timeslot configuration of the macro cell on the subband i is presented in Table 2 in a sequence from a subframe 0 to a subframe 9.

TABLE 2

| Uplink-downlink timeslot configuration of the macro cell on the subband I | | | | | | | | | |
|---|---|---|---|---|---|---|---|---|---|
| Subframe 0 | Subframe 1 | Subframe 2 | Subframe 3 | Subframe 4 | Subframe 5 | Subframe 6 | Subframe 7 | Subframe 8 | Subframe 9 |
| D | S | U | U | D | D | S | U | U | D |

An uplink-downlink timeslot configuration of the small cell on the subband I is presented in Table 3 in a sequence from a subframe 0 to a subframe 9.

TABLE 3

| Uplink-downlink timeslot configuration of the small cell on the subband I | | | | | | | | | |
|---|---|---|---|---|---|---|---|---|---|
| Subframe 0 | Subframe 1 | Subframe 2 | Subframe 3 | Subframe 4 | Subframe 5 | Subframe 6 | Subframe 7 | Subframe 8 | Subframe 9 |
| D | S | U | D | D | D | S | U | D | D |

D represents a downlink subframe, U represents an uplink subframe, and S represents a special subframe.

When the foregoing solution (3) is used, if on the subband I, a small-cell base station detects that there is high interference in the subframe 2 (an uplink subframe) but not in the subframe 3 (a downlink subframe), the small-cell base station sends R_ind signaling and OI signaling to a macro-cell base station. The R_ind signaling is used to indicate that the small cell receives interference from the macro cell on the subframe 2 of the subband I configured to be in the flexible half-duplex mode, and the OI signaling is used to indicate an interference level.

After receiving the R_ind signaling and the OI signaling sent by the small cell, the macro-cell base station may perform power control and/or scheduling restriction for the subframe 2 of the subband I, but not performs power control and/or scheduling restriction for all uplink frequency bands or frequency subbands, so as to improve resource efficiency.

Scenario 3

A macro cell is adjacent to a small cell. Both the macro cell and the small cell are operating on a frequency subband subband I, and a subframe 3 of the subband I is configured to be in the flexible half-duplex mode.

The macro cell notifies, by sending $FD_{res\_}ind$ signaling, a neighboring cell that the subframe 3 of the subband I is configured to be in the flexible half-duplex mode.

The small cell learns, according to the $FD_{res\_}ind$ signaling sent by the macro cell, that the subframe 3 of the subband I is configured to be in the flexible half-duplex mode. Therefore, when detecting interference from the macro cell on the subframe 3 of the subband I, the small cell sends ALI signaling to the macro cell, to indicate to the macro cell that some PRBs on the subframe 3 of the subband I receive the interference from the macro cell. A macro-cell base station may further perform a measurement for the subframe 3 of the subband I according to the ALI signaling, and perform interference suppression according to a result of the measurement.

In some other scenarios, when the macro cell uses a type of uplink-downlink timeslot configuration with relatively many uplink transmissions, to save energy in a low-load state, the macro cell may restrict most uplink transmissions to one uplink frequency resource, and another uplink frequency resource may be almost idle (that is, no user equipment is scheduled to send data on this uplink frequency resource). In this case, the macro-cell base station may notify, by sending R_ind signaling and HII signaling, the neighboring cell that the uplink frequency resource and a subframe of the uplink frequency resource receive interference. In this way, scheduling flexibility can be improved and neighboring-cell resource utilization can be improved more effectively.

Based on the same technical conception, an embodiment of the present disclosure further provides a base station.

Figure 2:
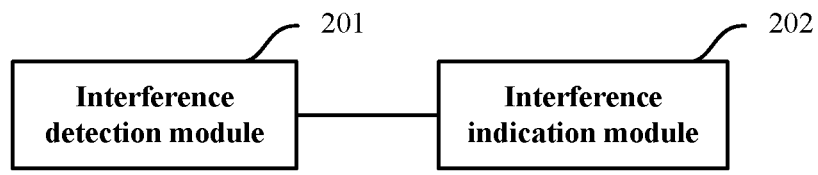
FIG. 2 is a schematic structural diagram of a base station according to an embodiment of the present disclosure.

Referring to FIG. 2, FIG. 2 is a schematic structural diagram of a base station according to an embodiment of the present disclosure. The base station may include an interference detection module 201 and an interference indication module 202.

The interference detection module 201 is configured to detect interference from a neighboring cell.

The interference indication module 202 is configured to send interference indication information to the neighboring cell, where the interference indication information includes at least indication information of a frequency resource that receives the interference from the neighboring cell, the frequency resource is a frequency resource configured to be in a flexible half-duplex mode, and the frequency resource includes one or a combination of a frequency band, a frequency subband, a partial frequency band, or a partial frequency subband.

Preferably, the interference indication information further includes one piece of or a combination of the following information: indication information of a subframe that receives the interference from the neighboring cell and that is on the frequency resource; indication information of a PRB that receives the interference from the neighboring cell and that is on the frequency resource; or interference level indication information of the interference from the neighboring cell.

The subframe that receives the interference from the neighboring cell and that is on the frequency resource is a subframe that receives reverse transmission interference from the neighboring cell and that is on the frequency resource; or the PRB that receives the interference from the neighboring cell and that is on the frequency resource is a PRB that receives reverse transmission interference from the neighboring cell and that is on the frequency resource.

Preferably, in some embodiments, the interference indication information is carried in first signaling for transmission.

Preferably, in some other embodiments, the interference indication information is carried in first signaling and second signaling for transmission. The first signaling includes the interference level indication information of the interference from the neighboring cell, and the second signaling includes the indication information of the frequency resource that receives the interference from the neighboring cell.

Further, the first signaling further includes the indication information of the subframe and/or the PRB that receive/receives the interference from the neighboring cell; or the second signaling further includes the indication information of the subframe and/or the PRB that receive/receives the interference from the neighboring cell.

Preferably, in some other embodiments, the interference indication information is carried in second signaling and OI signaling for transmission, where the second signaling includes the indication information of the frequency resource that receives the interference from the neighboring cell, and the OI signaling includes interference level indication information of the interference from the neighboring cell to the frequency resource indicated by the first interference indication signaling.

Further, the OI signaling further includes the indication information of the subframe and/or the PRB that receive/receives the interference from the neighboring cell; or the second signaling further includes the indication information of the subframe and/or the PRB that receive/receives the interference from the neighboring cell.

Preferably, in some other embodiments, the interference indication information is carried in second signaling and HII signaling for transmission, where the second signaling includes the indication information of the frequency resource that receives the interference from the neighboring cell, and the HII signaling includes indication information of a PRB that probably causes interference to the neighboring cell and that is on the frequency resource indicated by the second signaling.

Further, the HII signaling further includes the indication information of the subframe that receives the interference from the neighboring cell, and/or the interference level indication information; or the second signaling further includes the indication information of the subframe and/or the PRB that receive/receives the interference from the neighboring cell.

Further, in some embodiments, the base station further receives indication information of a time resource and/or a frequency resource that are/is configured to be in the flexible half-duplex mode, where the indication information is sent by the neighboring cell; and/or the base station may send indication information of a time resource and/or a frequency resource that are/is configured to be in the flexible half-duplex mode. Preferably, the indication information of the time resource and/or the frequency resource that are/is configured to be in the flexible half-duplex mode is sent by means of semi-persistent broadcasting.

Based on the same technical conception, an embodiment of the present disclosure further provides a base station.

Figure 3:
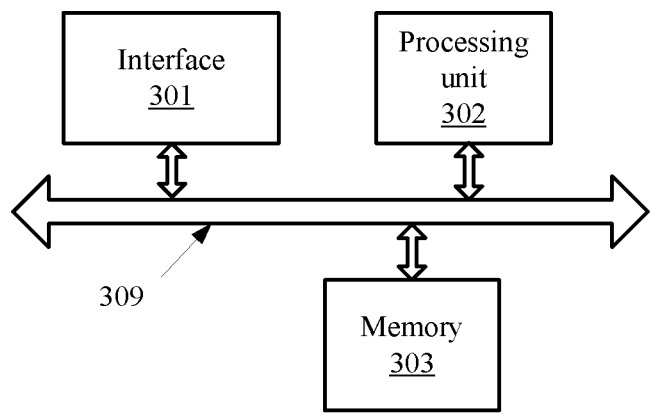
FIG. 3 is a schematic structural diagram of a base station according to another embodiment of the present disclosure.

Referring to FIG. 3, FIG. 3 is a schematic structural diagram of a base station according to an embodiment of the present disclosure.

As shown in the figure, the base station may include an interface 301, a processing unit 302, and a memory 303. The processing unit 302 is configured to control an operation of the base station. The memory 303 may include a read-only memory and a random access memory and is configured to provide an instruction and data for the processing unit 302. A part of the memory 303 may further include a non-volatile random access memory (NVRAM). Components of the base station are coupled together using a bus system. In addition to a data bus, the bus system 309 includes a power bus, a control bus, and a state signal bus. However, for clear description, various buses are marked as the bus system 309 in the figure.

An interference indication procedure implemented by the base station disclosed in this embodiment of the present disclosure may be applied to the processing unit 302 or be implemented by the processing unit 302. During implementation, steps in the interference indication procedure implemented by the base station may be implemented using an integrated logic circuit of hardware in the processing unit 302, or using an instruction in a form of software. The processing unit 302 may be a general purpose processor, a digital signal processor, an application-specific integrated circuit, a field programmable gate array or another programmable logic device, a discrete gate or a transistor logic device, or a discrete hardware component. The processing unit 302 may implement or execute methods, steps, or logical schematic diagrams disclosed in this embodiment of the present disclosure. The general purpose processor may be a microprocessor, any conventional processor, or the like. The steps of the methods disclosed with reference to this embodiment of the present disclosure may be directly implemented by a hardware processor, or may be implemented by a combination of hardware and a software module in a processor. The software module may be in a random access memory, a flash memory, a read-only memory, a programmable read-only memory or an electrically erasable programmable memory, a register, or another mature storage medium in the art. The storage medium is located in the memory 303. The processing unit 302 reads information in the memory 303 and completes, with reference to hardware of the processing unit 302, the steps of the interference indication procedure implemented by the base station.

Specifically, the processing unit 302 may be configured to execute the interference indication procedure described in the foregoing embodiment. The procedure may include detecting interference from a neighboring cell; and sending interference indication information to the neighboring cell, where the interference indication information includes at least indication information of a frequency resource that receives the interference from the neighboring cell, the frequency resource is a frequency resource configured to be in a flexible half-duplex mode, and preferably, the frequency resource includes one or a combination of a frequency band, a frequency subband, a partial frequency band, or a partial frequency subband.

Preferably, the interference indication information further includes one piece of or a combination of the following information: indication information of a subframe that receives the interference from the neighboring cell and that is on the frequency resource; indication information of a PRB that receives the interference from the neighboring cell and that is on the frequency resource; or interference level indication information of the interference from the neighboring cell.

The subframe that receives the interference from the neighboring cell and that is on the frequency resource is a subframe that receives reverse transmission interference from the neighboring cell and that is on the frequency resource; or the PRB that receives the interference from the neighboring cell and that is on the frequency resource is a PRB that receives reverse transmission interference from the neighboring cell and that is on the frequency resource.

Preferably, in some embodiments, the interference indication information is carried in first signaling for transmission.

Preferably, in some other embodiments, the interference indication information is carried in first signaling and second signaling for transmission. The first signaling includes the interference level indication information of the interference from the neighboring cell, and the second signaling includes the indication information of the frequency resource that receives the interference from the neighboring cell.

Further, the first signaling further includes the indication information of the subframe and/or the PRB that receive/receives the interference from the neighboring cell; or the second signaling further includes the indication information of the subframe and/or the PRB that receive/receives the interference from the neighboring cell.

Preferably, in some other embodiments, the interference indication information is carried in second signaling and OI signaling for transmission, where the second signaling includes the indication information of the frequency resource that receives the interference from the neighboring cell, and the OI signaling includes interference level indication information of the interference from the neighboring cell to the frequency resource indicated by the first interference indication signaling.

Further, the OI signaling further includes the indication information of the subframe and/or the PRB that receive/receives the interference from the neighboring cell; or the second signaling further includes the indication information of the subframe and/or the PRB that receive/receives the interference from the neighboring cell.

Preferably, in some other embodiments, the interference indication information is carried in second signaling and HII signaling for transmission, where the second signaling includes the indication information of the frequency resource that receives the interference from the neighboring cell, and the HII signaling includes indication information of a PRB that probably causes interference to the neighboring cell and that is on the frequency resource indicated by the second signaling.

Further, the HII signaling further includes the indication information of the subframe that receives the interference from the neighboring cell, and/or the interference level indication information; or the second signaling further includes the indication information of the subframe and/or the PRB that receive/receives the interference from the neighboring cell.

Further, in some embodiments, the base station further receives indication information of a time resource and/or a frequency resource that are/is configured to be in the flexible half-duplex mode, where the indication information is sent by the neighboring cell; and/or the base station may send indication information of a time resource and/or a frequency resource that are/is configured to be in the flexible half-duplex mode. Preferably, the indication information of the time resource and/or the frequency resource that are/is configured to be in the flexible half-duplex mode is sent by means of semi-persistent broadcasting.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device, so that the instructions executed by the computer or the processor of any other programmable data processing device may implement a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn of the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the claims of the present disclosure and their equivalent technologies.

What is claimed is:

1. An interference indication method, comprising:
   detecting, by a base station, interference from a neighboring cell; and
   sending, by the base station, interference indication information to the neighboring cell,
   wherein the interference indication information comprises indication information of a frequency resource that receives the interference from the neighboring cell,
   wherein the frequency resource is a frequency resource configured to be in a flexible half-duplex mode in which an uplink-downlink timeslot configuration is adaptively implemented according to a service need,
   wherein the interference indication information further comprises indication information of a subframe or a physical resource block (PRB) that receives the interference from the neighboring cell and that is on the frequency resource, and interference level indication information of the interference from the neighboring cell,
   wherein the indication information of the frequency resource is represented by an identity of a frequency band, a frequency subband, a partial frequency band, or a partial frequency subband, and
   wherein each frequency band, frequency subband, partial frequency band, or partial frequency subband is identified using a unique identifier (ID).

2. The method according to claim 1, wherein the interference from the neighboring cell is reverse transmission interference from the neighboring cell.

3. The method according to claim 1, wherein the interference indication information is carried in asymmetric link direction indicator (ALI) signaling for transmission.

4. The method according to claim 1, wherein the interference indication information is carried in ALI signaling and resource indicator (R_ind) signaling for transmission, wherein the ALI signaling comprises the interference level indication information of the interference from the neighboring cell, and wherein the R_ind signaling comprises the indication information of the frequency resource that receives the interference from the neighboring cell.

5. The method according to claim 1, wherein the interference indication information is carried in R_ind signaling and overload indication (OI) signaling for transmission, wherein the R_ind signaling comprises the indication information of the frequency resource that receives the interference from the neighboring cell, and wherein the OI signaling comprises interference level indication information of the interference from the neighboring cell to the frequency resource indicated by the R_ind signaling.

6. The method according to claim 5, wherein either the OI signaling further comprises at least one of indication information of a subframe or a PRB that the interference from the neighboring cell, or wherein the frequency resource indicated by the R_ind signaling is at least one of a subframe or a PRB.

7. The method according to claim 1, wherein the interference indication information is carried in R_ind signaling and high interference indication (HII) signaling for transmission, wherein the R_ind signaling comprises the indication information of the frequency resource that receives the interference from the neighboring cell, and wherein the HII signaling comprises indication information of a PRB that causes interference to the neighboring cell and that is on the frequency resource indicated by the R_ind signaling.

8. The method according to claim 7, wherein either the HII signaling further comprises indication information of a subframe that receives the interference from the neighboring cell, or interference level indication information, or wherein the frequency resource indicated by the R_ind signaling is at least one of a subframe or a PRB.

9. A base station, comprising:
   a memory storing executable instructions; and
   a processor coupled to the memory and configured to:
      detect interference from a neighboring cell; and
      send interference indication information to the neighboring cell,
      wherein the interference indication information comprises indication information of a frequency resource that receives the interference from the neighboring cell,
      wherein the frequency resource is a frequency resource configured to be in a flexible half-duplex mode in which an uplink-downlink timeslot configuration is adaptively implemented according to a service need,
      wherein the interference indication information further comprises indication information of a subframe or a physical resource block (PRB) that receives the interference from the neighboring cell and that is on the frequency resource, and interference level indication information of the interference from the neighboring cell,
      wherein the indication information of the frequency resource is represented by an identity of a frequency band, a frequency subband, a partial frequency band, or a partial frequency subband, and
      wherein each frequency band, frequency subband, partial frequency band, or partial frequency subband is identified using a unique identifier (ID).

10. The base station according to claim 9, wherein interference from the neighboring cell is reverse transmission interference from the neighboring cell.

11. The base station according to claim 9, wherein the interference indication information is carried in asymmetric link direction indicator (ALI) signaling for transmission.

12. The base station according to claim 9, wherein the interference indication information is carried in ALI signaling and resource indicator (R_ind) signaling for transmission, wherein the ALI signaling comprises the interference level indication information of the interference from the neighboring cell, and wherein the R_ind signaling comprises the indication information of the frequency resource that receives the interference from the neighboring cell.

13. The base station according to claim 9, wherein the interference indication information is carried in R_ind signaling and overload indication (OI) signaling for transmission, wherein the R_ind signaling comprises the indication information of the frequency resource that receives the interference from the neighboring cell, and wherein the OI signaling comprises interference level indication information of the interference from the neighboring cell to the frequency resource indicated by the R_ind signaling.

14. The base station according to claim 13, wherein either the OI signaling further comprises at least one of indication information of a subframe or a PRB that receives the interference from the neighboring cell, or wherein the frequency resource indicated by the R_ind signaling is at least one of a subframe or a PRB.

15. The base station according to claim 9, wherein the interference indication information is carried in R_ind signaling and high interference indication (HII) signaling for transmission, wherein the R_ind signaling comprises the indication information of the frequency resource that receives the interference from the neighboring cell, and wherein the HII signaling comprises indication information of a PRB that causes interference to the neighboring cell and that is on the frequency resource indicated by the R_ind signaling.

16. The base station according to claim 15, wherein either the HII signaling further comprises indication information of a subframe that receives the interference from the neighboring cell, or interference level indication information, or wherein the frequency resource indicated by the R_ind signaling is at least one of a subframe or a PRB.

* * * * *

UNITED STATES PATENT AND TRADEMARK OFFICE
CERTIFICATE OF CORRECTION

PATENT NO. : 10,601,568 B2
APPLICATION NO. : 15/764711
DATED : March 24, 2020
INVENTOR(S) : Lili Zhang, Richard Stirling-Gallacher and Bin Liu Page 1 of 1

It is certified that error appears in the above-identified patent and that said Letters Patent is hereby corrected as shown below:

Claim 5, Column 21, Line 67:
"PRB that the interference"
Should read:
"PRB that receives the interference"

Signed and Sealed this
Twenty-sixth Day of May, 2020

Andrei Iancu
*Director of the United States Patent and Trademark Office*